United States Patent [19]

Zhang et al.

[11] Patent Number: 5,042,859
[45] Date of Patent: Aug. 27, 1991

[54] PNEUMATIC BUMPER MOUNTED ON A BASE

[75] Inventors: Ning Zhang, No. 10, Unit 5, Bldg. 11, 2nd North St. Shuinian River, Chengdu, Sichuan Province; Jirong Zhou; Xiaolan Peng, both of Chengdu, all of China

[73] Assignee: Ning Zhang, Chengdu, China

[21] Appl. No.: 407,122

[22] Filed: Sep. 14, 1989

[30] Foreign Application Priority Data

Dec. 5, 1988 [CN] China ............................ 88108130

[51] Int. Cl.⁵ ................................................ B60R 19/20
[52] U.S. Cl. .................................... 293/107; 293/121; 293/122; 293/134; 267/64.27; 267/116
[58] Field of Search ............... 293/107, 117, 121, 122, 293/134, 135; 267/64.27, 116, 122, 139

[56] References Cited

U.S. PATENT DOCUMENTS

| 1,580,203 | 4/1926 | Jasheway et al. | 293/107 |
| 1,601,641 | 9/1926 | Ostria | 293/107 |
| 1,681,677 | 8/1928 | Musselman | 293/107 |
| 1,881,390 | 10/1932 | Schmidt | 293/107 |
| 1,885,474 | 11/1932 | Pat | 293/107 |
| 1,886,913 | 11/1932 | Sill et al. | 293/107 |
| 2,236,507 | 4/1941 | Kreitz | 293/107 |
| 3,203,722 | 8/1965 | Zahorodny | 293/107 X |
| 3,473,836 | 10/1969 | Halter | 293/107 |
| 3,603,633 | 9/1971 | Eshelman | 293/107 X |
| 3,764,174 | 10/1973 | Taninecz | 293/107 |
| 3,866,962 | 2/1975 | Eshelman | 293/107 X |
| 3,961,818 | 6/1976 | Roth Jr. | |
| 4,324,301 | 4/1982 | Eyerly | 293/107 X |
| 4,372,701 | 2/1983 | Watanabe | 293/121 X |

FOREIGN PATENT DOCUMENTS

| 1141201 | 12/1962 | Fed. Rep. of Germany | 293/122 |
| 2207560 | 8/1973 | Fed. Rep. of Germany | 293/107 |
| 2351752 | 4/1975 | Fed. Rep. of Germany | 293/107 |
| 2416799 | 9/1975 | Fed. Rep. of Germany | |
| 2823299 | 12/1979 | Fed. Rep. of Germany | |
| 619264 | 3/1927 | France | 293/107 |
| 550194 | 12/1942 | United Kingdom | |

Primary Examiner—Margaret A. Focarino
Assistant Examiner—Andrew C. Pike
Attorney, Agent, or Firm—Kenyon & Kenyon

[57] ABSTRACT

The present invention relates to a vehicle bumper which performs an effective function of reducing any impact forces acting on the vehicle and thus protects the safety of the passengers and the vehicle. The bumper according to the present invention comprises a base and a pneumatic cushion connected with the base and filled with gas.

18 Claims, 6 Drawing Sheets

PNEUMATIC BUMPER MOUNTED ON A BASE

FIELD OF THE INVENTION

The invention relates to a novel energy absorbing vehicle bumper which posesses the function of buffering and thus effectively reduces impact forces acting on the vehicle.

BACKGROUND OF THE INVENTION

Bumpers perform as protectors of passengers and vehicles when collisions between vehicles or between vehicles and other things happen. Yet, the protective effects of bumpers are not satisfactory. It has been known that the presently used bumpers can be roughly classified into three categories, which are all-metal, rubber encapsulated, and rubber inlaid type. The all-metal type bumpers basically do not have buffering function and can not reduce any impact forces; the other two have some buffering function due to the encapsulated or inlaid rubber, but their buffering effects are not satisfactory.

OBJECT OF THE INVENTION

The object of the invention is to provide a pneumatic cushion vehicle bumper which effectively reduces impact forces to vehicles and thus ensures the safety of passengers and vehicles.

Another object of the invention is to provide a pneumatic cushion vehicle bumper of a wide application for all kinds of vehicles.

Other objects and advantages will become apparent from the detailed description hereinafter.

SUMMARY OF THE INVENTION

A bumper for a motor vehicle according to the present invention comprises a base and at least one pneumatic cushion connected with the base and filled with air. The operating air condition or pressure within the pneumatic cushion ranges from 0.5 kg/cm$^2$ to 10 kg/cm$^2$ (gauge), preferably, from 2 kg/cm$^2$ to 6 kg/cm$^2$ (gauge).

DETAILED DESCRIPTION OF THE INVENTION

Figure 2:
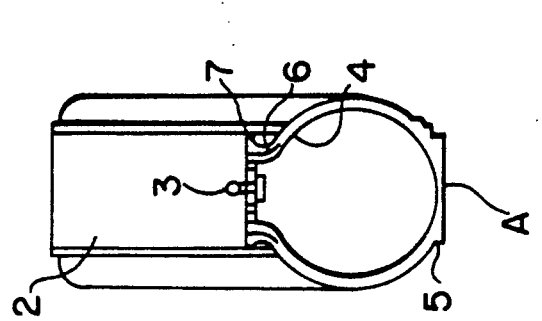
FIG. 2 is a sectional view taken along the Line I—I in FIG. 1.

A vehicle bumper according to the present invention comprises a base and at least one pneumatic cushion which connects with the base and is filled with gas.

The pneumatic cushion can be made of high polymer materials or other materials which possess certain strength, elasticity, toughness and good air tightness. It is formed into various shapes, such as a tube-shaped belt with both ends sealed or an inter-communicated endless belt, etc. The cross section of the pneumatic cushion can be of different shapes, and a circular shape is preferred for its easier processing and better performance.

The base can be made of various kinds of materials, such as steel or other metals which are commonly used today. The base can be made of materials of less strength and rigidity, because the base bears greatly reduced impact forces compared to a conventional bumper. This is due to the buffering effect of the pneumatic cushion and the fact that impact forces acting on the base are uniformly distributed. The base can be formed into a U shape which is similar to that of a conventional bumper or any other desired shapes, and can be fixed to the vehicle body by conventional means, such as by a bolt or welding, etc. The base can be produced through conventional processes, e.g., stamping and welding, etc. The cross section of the base can be in many forms. Some of these forms are described in the embodiments hereinafter. Preferably the side of the base which contacts the belt is a circular arc in the cross section of the base to match the pneumatic cushion having a preferred cross section shape, which is a circular shape as well. A bumper with such a structure has better function effect. A liner made of rubber, cloth or other materials may be added between the cushion and the base for better contact or fitness when a bumper is assembled.

A protective layer may be added to prevent the pneumatic cushion from damage by avoiding direct contact with the cushion when a collision happens or strengthening the pneumatic cushion when the pressure within the pneumatic cushion exceeds the limiting pressure of the cushion. The protective layer wraps partly or wholly around the pneumatic cushion or the assembly of the pneumatic cushion and the base. The protective layer is made of plastics, metal or other materials and is designed in accordance with the shape of the pneumatic cushion or the assembly of the pneumatic cushion and the base. It may have its outer configuration similar to that of a conventional bumper. When more than one pneumatic cushion is used, more than one protective layer may be applied.

The base may connect with the pneumatic cushion in many ways. For example, the base may be in the form of a groove plate and may have concave portions extending along the longitudinal edges of the groove plate, complementary convex portions may be provided on the pneumatic cushion or the protective layer longitudinally, the concave portions bearing closely against the convex portions on the pneumatic cushion or the protective layer after the pneumatic cushion is inflated, to connect the base and the pneumatic cushion or the base may connect with the pneumatic cushion by adhesion.

One or more gas inflation means, such as a gas inflation valve, is provided on the pneumatic cushion, by means of which gas, preferably air, can be filled into the pneumatic cushion. The pneumatic cushion is inflated before the bumper is put to use. The operation condition or pressure within the pneumatic cushion ranges from 0.5 kg/cm$^2$ to 10 kg/cm$^2$ (gauge), preferably 2 kg/cm$^2$ to 6 kg/cm$^2$ (gauge), which is determined in accordance with many factors such as the weight of the vehicle, the speed of the vehicle, etc. The pressure within the pneumatic cushion is maintained when the bumper is being used. At least one pressure relief valve may be further provided on the pneumatic cushion which performs the functions of protecting the pneumatic cushion when the pressure inside the cushion increases sharply, and multiple buffering is provided by decreasing the pressure within the pneumatic cushion. When the pneumatic cushion is compressed in case of any collision of a vehicle, the pressure within the pneumatic cushion may exceed the limiting pressure of the pneumatic cushion, which is related to the material of the cushion. In this case, the pressure relief valve may open automatically and release some of the gas within the pneumatic cushion. Thus, the pressure can be decreased and the pneumatic cushion is protected from damage. Moreover, after some of the gas is released, the pneumatic cushion can be further compressed until the preset pressure of the relief valve is reached, thus performing a further buffering function. The repeat of this process may provide a multiple buffering function. The preset pressure of the pressure relief valve is determined by many factors, e.g., the material used for the pneumatic cushion. The operation condition or pressure of the pressure relief valve, ranges from 2 kg/cm$^2$ to 12 kg/cm$^2$ preferably.

A bumper according to the invention possesses an effective buffering function. When a vehicle collides with any obstacles, the pneumatic cushion or the protective layer bumps against the obstacles first. As the inflated pneumatic cushion is compressed, it greatly absorbs the kinetic energy of the vehicle and thus reduces the impact forces acting on the vehicle. Moreover, the impact forces transferred to the base, and then the vehicle, are uniformly distributed forces rather than a concentrated force. Thus the damage to the base is decreased; and the vehicle can be protected.

A bumper according to the present invention can be applied to any conventional vehicles without any influence on the original design. It has lower cost, simpler structure and processes, easier assembly, and can be repetitively used.

A description of the invention will now be made with reference to the accompanying drawings.

Figure 1:
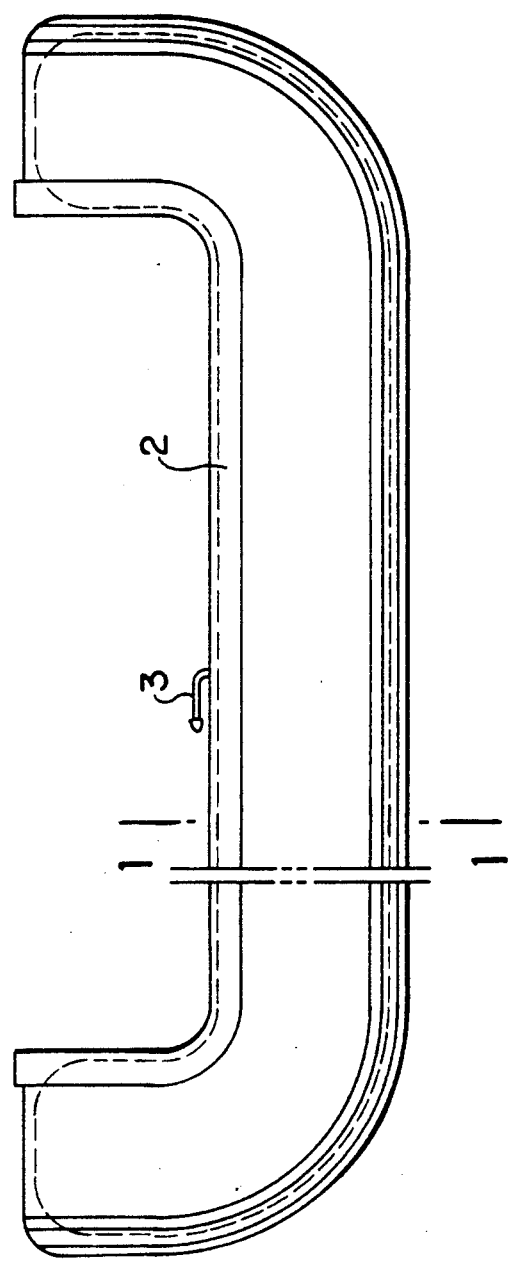
FIG. 1 is a schematic view of the first embodiment of the bumper assembly according to the invention.

FIGS. 1 and 2 show the first embodiment of the bumper according to the present invention. In the assembly, the pneumatic cushion is in the form of a belt 4 which has its ends sealed. The belt 4 is made of butyl rubber or other synthetic rubber and formed by extrusion or other processes. A gas inflation valve 3 is provided on the belt 4 for inflating the belt 4. By means of the gas inflation valve 3, the belt 4 can be reinflated and therefore be repetitively used. A base which is in the form of a groove plate 2 is made of metal and formed through conventional processes, such as rolling or stamping. The groove plate 2 has a straight line cross section shape with both ends bent into concave shapes. The groove plate 2 is further provided with a through hole (not shown) for passing through the gas inflation valve 3. A protective layer 5 which is made of plastic or other material and formed by conventional processes, e.g., extrusion, wraps the belt 4. The protective layer 5 protects the belt 4 from damage caused by direct contact with the obstacles it bumps or an exceeding pressure within the pneumatic cushion. The protective layer 5 further connects the belt 4 with the groove plate 2 by the engagement of convex portions 6 which are integrally formed with the protective layer 5 along its longitudinal edges and corresponding concave portions 7 on the groove plate 2. As can be seen in FIG. 2, the inner surface of the protective layer 5 is circular and the outer surface has a flat surface A at the front side and is similar to the shape of a conventional bumper, or the outer surface can be any shape which is of aesthetic design.

As the bumper is to be assembled, the belt 4 is first wrapped by the protective layer 5; then, the protective layer 5 and the belt 4 are fitted on the groove plate 2 by the engagement of the convex portions 6 and the concave portions 7; after that, the belt 4 is inflated and the expanded belt 4 bears against the inner surface of the protective layer 5, and then, the convex portions 6 of the protective layer 5 bear against the concave portions 7 of the groove plate 2; thus the connection is completed. The operating condition or pressure within the belt 4 can range from 0.5 kg/cm$^2$ to 10 kg/cm$^2$ or 2 kg/cm$^2$ to 6 kg/cm$^2$ (gauge) preferably. The specific operating pressure can be determined according to many factors, such as the loading capacity of a vehicle, the speed of a vehicle, etc.

Figure 4:
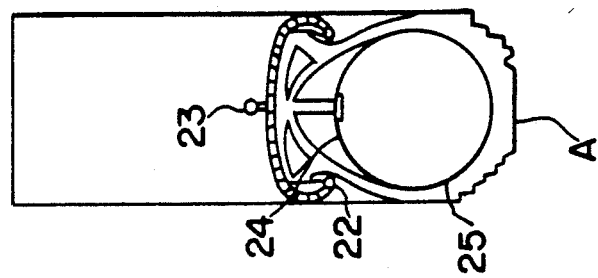
FIG. 4 is a sectional view taken along tee Line II—II in FIG. 3.
Figure 3:
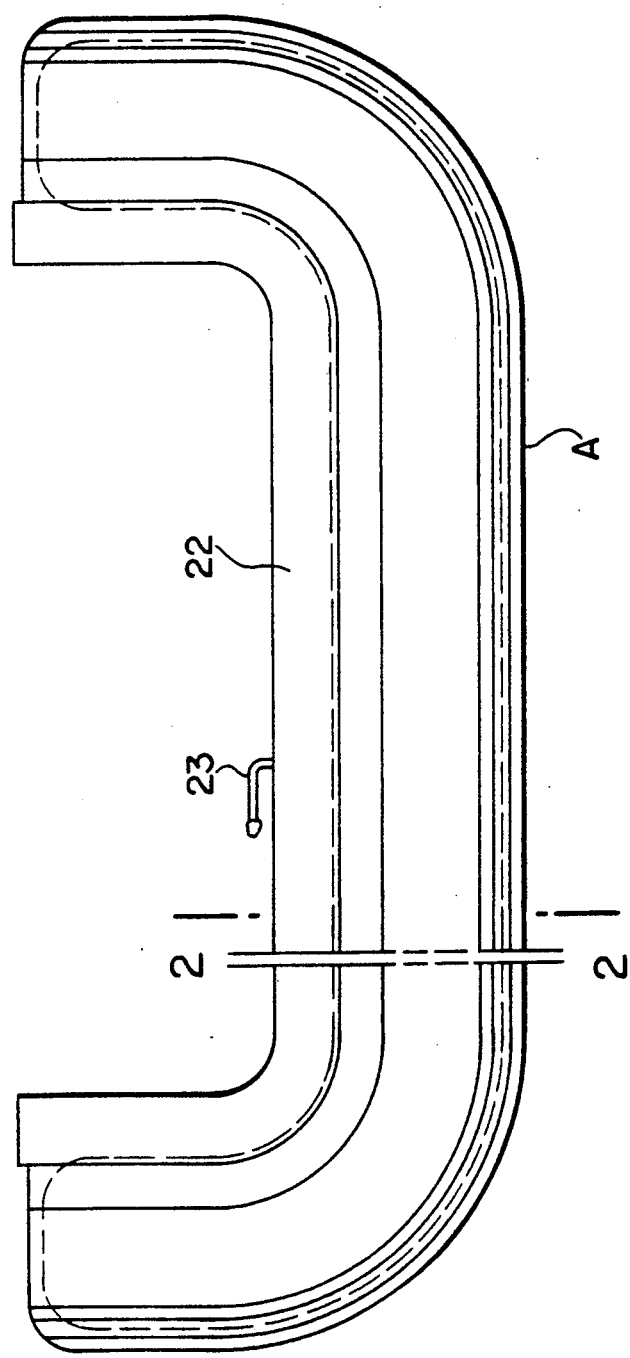
FIG. 3 is similar to FIG. 1 but shows the second embodiment of the invention.

FIGS. 3 and 4 show the second embodiment of the bumper according to the present invention, which is similar to the first embodiment. In this second embodiment and the following embodiments, the components with functions identical or analogous to those in the first embodiment are designated by reference numerals retaining the last digit from the first embodiment. In addition to the identical components, the components whose function or configuration has changed and the newly added components are explained. It can be seen in FIG. 4 that the cross section of the groove plate 22 is a C shape and the cross section of the belt 24 is circular. The protective layer 25 has a different configuration from that of the first embodiment.

Figure 6:
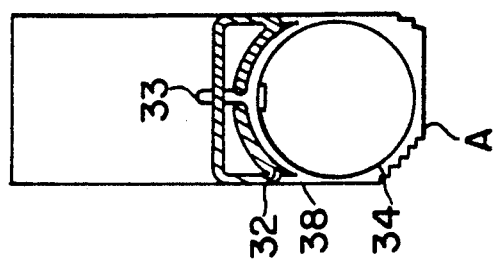
FIG. 6 is a sectional view taken along the Line III—III in FIG. 5.
Figure 5:
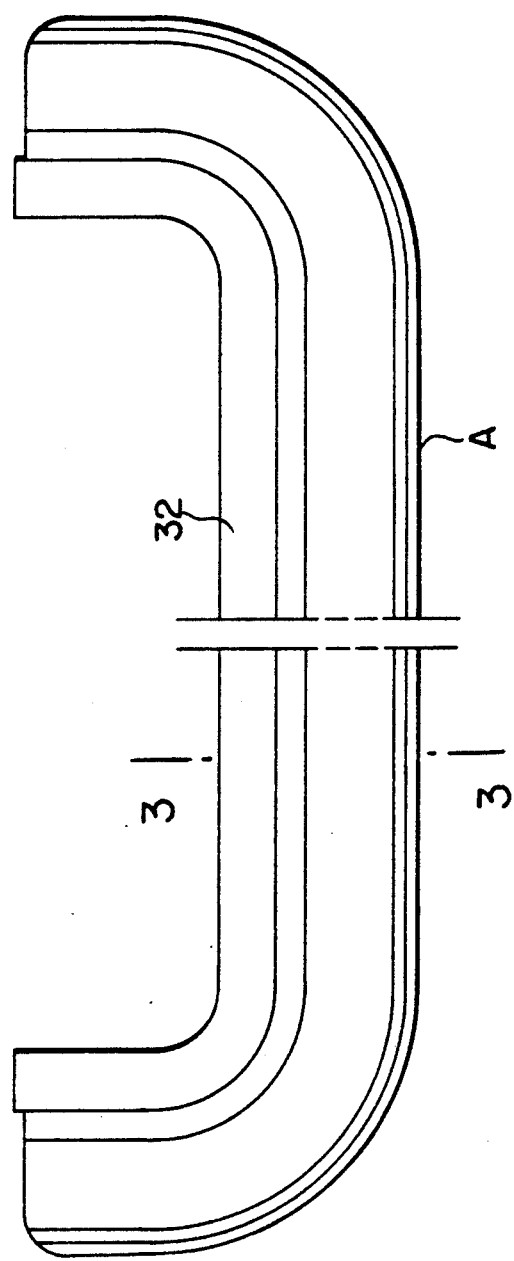
FIG. 5 is similar to FIG. 1 but shows the third embodiment of the invention.

FIGS. 5 and 6 show the third embodiment of the bumper according to the present invention. The differences between the first and the third embodiments are: the cross section of the groove plate is an enclosed frame with one circular side which contacts the belt 34, the belt being directly connected with the groove plate 32 by an adhesive layer 38. In the cross section, the inner side of the belt 34 is circular and the outer side of the belt 34 is designed in accordance with the shape of a conventional bumper, or other desired configurations.

FIGS. 7 to 12 show the fourth embodiment of the bumper according to the present invention. The pneumatic cushion is in the form of an endless belt 44, as it can be understood with reference to FIGS. 11 and 12. The belt 44 can further comprise a front part 44a and a back part 44b. Both the front part 44a and the back part 44b have circular cross section shapes which are preferred shapes for a better functional effect. The cross section area of the back part 44b is smaller than that of the front part 44a (see FIG. 10), so that the volume of the bumper can be reduced. Gas inflation means, such as a gas inflation valve 43 are provided on the back part 44b by means of which gas, preferably air, can fill the belt 44. At a position "E" which is preferably located on the back part 44b of the belt 44, a pressure relief valve 55 is connected with the belt 44. When the pressure within the belt 44 exceeds the preset pressure of the pressure relief valve, the pressure relief valve may release some of the gas within the belt and thus protect the belt 44 from damage. Slots 40 are provided on the back part 44b for passing through any secure means 56 used to mount the bumper on a vehicle 57. The base 42 can be produced from various kinds of materials, advantageously by some materials which are of less strength and rigidity, because the impact forces acting on the base 42 are greatly reduced and uniformly distributed by means of the buffering function of the belt 44. The base 42 can be formed by conventional means, such as rolling, extruding and welding. The cross section shape of the base 42 is an enclosed frame (see FIG. 10) with a pair of opposite sides curved to match the circular cross section shape of the two parts, 44a and 44b. The curved sides are preferably circular arcs which are of better effect. A pair of liners 49 made of rubber, cloth or other materials may be further provided to compensate for any processing error of the circular arc shape of the base 42. A protective layer 45 made of plastic, metal or other materials is provided to wrap the belt 44 and the base 42 entirely. The cross section shape of the protective layer 45 can be seen in FIG. 8. The protective layer 45 is locked at position "B".

Figures 7, 8:
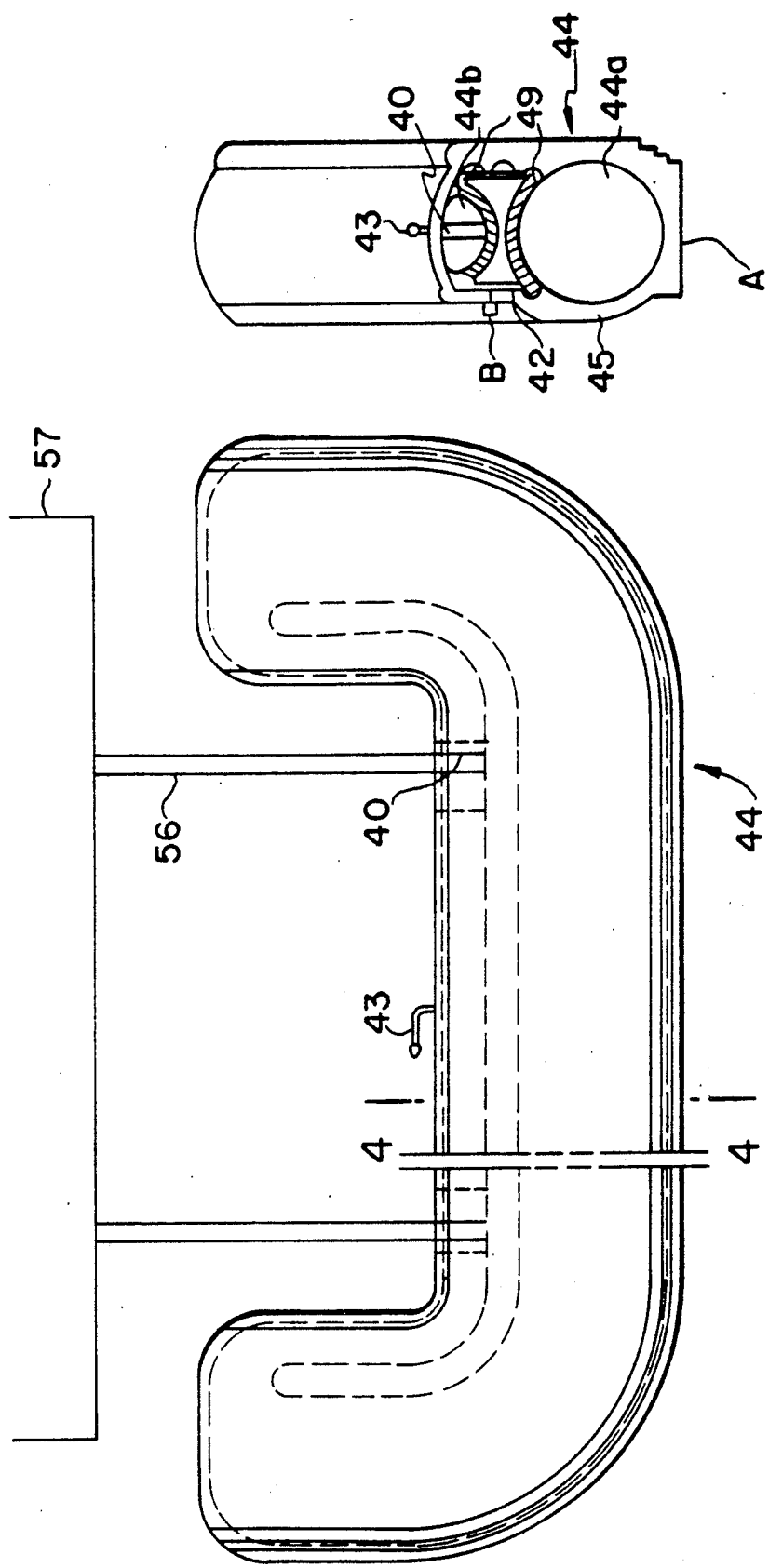
FIG. 7 is similar to FIG. 1 but shows the fourth embodiment of the invention.
FIG. 8 is a sectional view taken along the Line IV—IV in FIG. 7.
Figure 10:
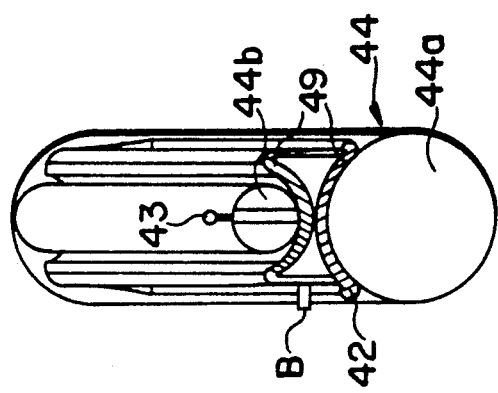
FIG. 10 is a sectional view taken along the Line V—V in FIG. 9.
Figure 9:
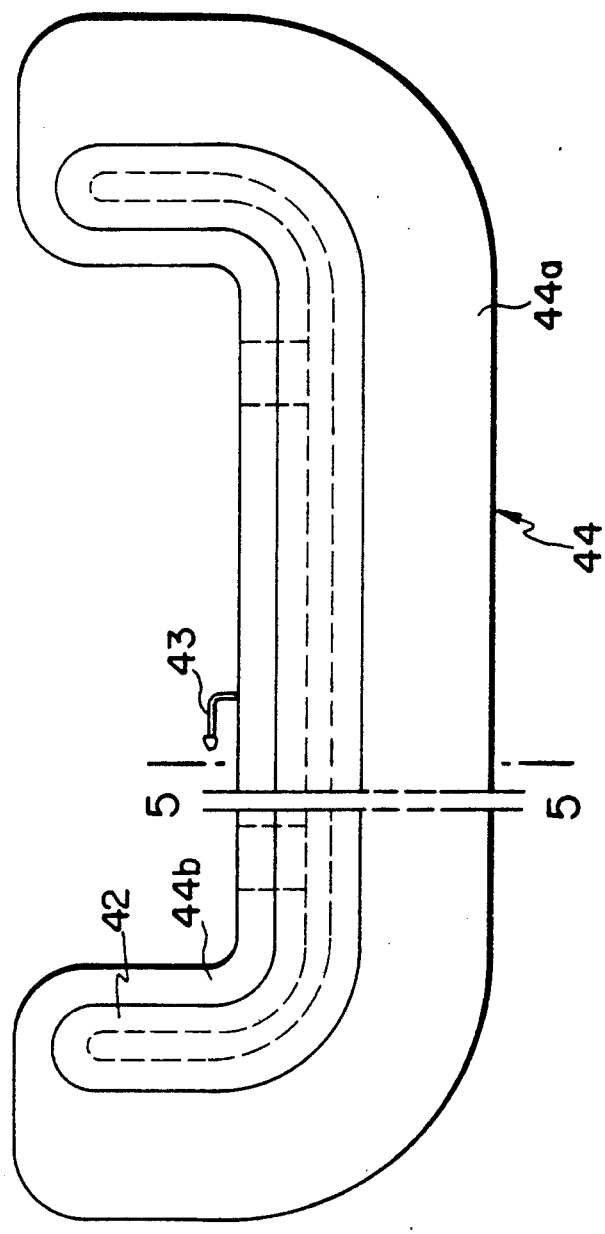
FIG. 9 is similar to FIG. 7 except that the protective layer is moved away.
Figure 11:
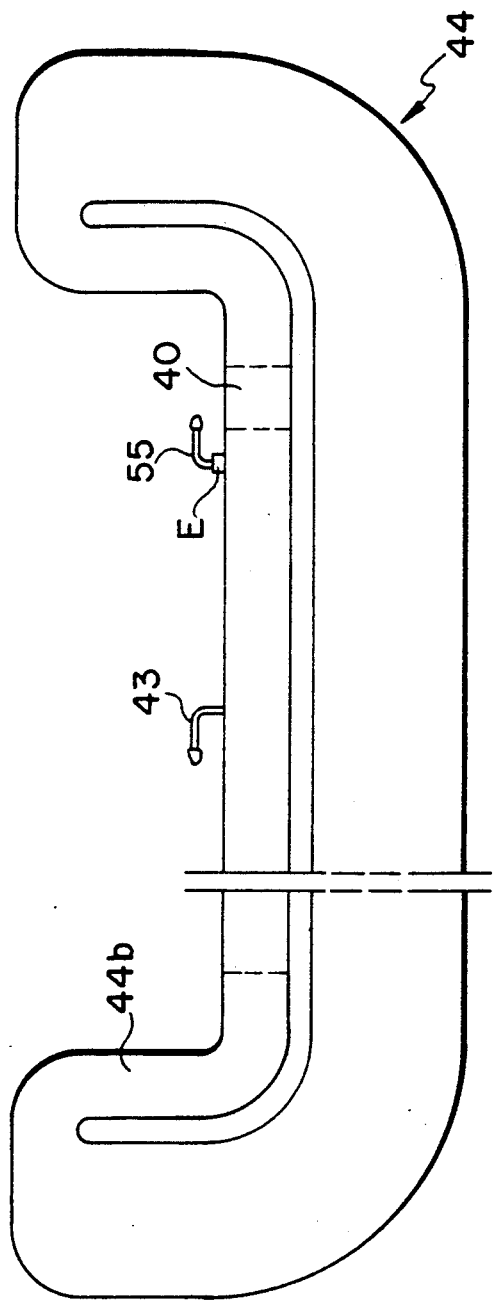
FIG. 11 is a front view of the inflated belt of the fourth embodiment.
Figure 12:
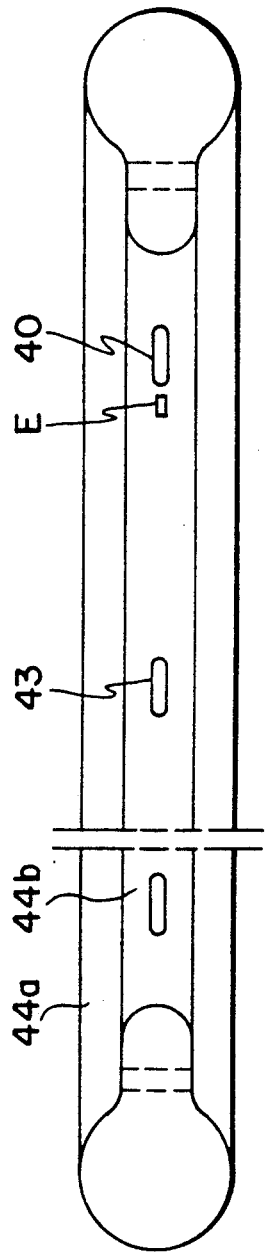
FIG. 12 is a top view of inflated belt of the fourth embodiment.

When the bumper is assembled, the belt 44, the base 42 and the protective layer 45 are separately formed. Then, the belt 44 is made to surround the base 42. After that, the belt 44 and the base 42 are wrapped by the protective layer 45 which is locked at position "B". Finally the belt 44 is inflated with gas until the operating pressure within the belt reaches the desired value. The inflated belt 44 bears against the base 42 and completes the connection of them (see FIG. 7). The operating condition or pressure within the belt 44 can range from 0.5 kg/cm$^2$ to 10 kg/cm$^2$, or 2 kg/cm$^2$ to 6 kg/cm$^2$ (gauge) preferably. When the bumper collides with any obstacle, the belt 44 is compressed. The inflated front part and back part, 44a and 44b, impose the reduced impact forces on the base 42 in opposite directions and thus improve the working condition of the base 42. As can be seen in FIG. 8, the back part 44b is compressed after inflation. Thus, the contact area between the back part 44b and the curved side of the base 42 is increased. Therefore, the working condition of the base 42 is further improved. As the belt 44 is compressed upon collision, the pressure within the belt 44 may increase sharply and exceed the preset pressure of the pressure relief valve. The pressure relief valve opens automatically and releases some of the gas within the belt 44. The pressure is thus decreased and the belt 44 can be further compressed performing a further buffering function until the pressure within the belt 44 reaches the preset pressure of the pressure relief valve a second time. Repetition of this process may provide a multiple buffering function.

It will be understood that variations and modifications may be effected without departing from the spirit and scope of the novel concept of this invention.

We claim:

1. A vehicle bumper comprising:
   (a) a base comprising a groove plate;
   (b) a pneumatic cushion in a form of an endless belt having a front part and a back part which surround the groove plate, the pneumatic cushion filled with gas and connected with the groove plate, the back part being provided with slots which receive securing means for mounting the base to a vehicle body.

2. A bumper according to claim 1 wherein the cushion has at least one gas inflation means and at least one pressure relief valve.

3. A bumper according to claim 2 wherein the front part of the belt has a larger cross-sectional area than that of the back part.

4. A bumper according to claim 3 wherein a protective layer is provided to wrap around the belt and the groove plate.

5. A bumper according to claim 4 wherein the cushion is made of polymer materials.

6. A bumper according to claim 4 wherein the protective layer is made of plastic.

7. A bumper according to claim 4 further comprising at least one liner provided between the plate and the cushion.

8. A bumper according to claim 3 wherein the gas is air.

9. A bumper according to claim 3 wherein the cushion has an operating condition of from 0.5 kg/cm$^2$ to 10 kg/cm$^2$ (gauge).

10. A bumper according to claim 9 wherein the operation condition ranges from 2 kg/cm$^2$ to 6 kg/cm$^2$ (gauge).

11. A vehicle comprising:
    (a) a base comprising a groove plate having curved sides;
    (b) a pneumatic cushion filled with gas having a front part and a back part, the back part being provided with at least one slot, the front part and the back part of the cushion surrounding the base;
    (c) a protective layer wrapped around the cushion;
    (d) securing means located in the slot for mounting the base to a vehicle body; and
    (e) The vehicle body connected to the base by the securing means.

12. A vehicle according to claim 11 wherein the cushion has an operating condition of from 0.5 kg/cm$^2$ to 10 kg/cm$^2$ (gauge).

13. A vehicle according to claim 11 wherein the operating condition ranges from 2 kg/cm$^2$ to 6 kg/cm$^2$ (gauge).

14. A vehicle according to claim 11 wherein the protective layer is made of plastic.

15. A vehicle according to claim 11 wherein the cushion has at least one gas inflation means.

16. A vehicle according to claim 11 wherein the cushion has at least one pressure relief valve.

17. A vehicle according to claim 11 wherein the front part of the cushion has a larger cross-sectional area than that of the back part.

18. A vehicle according to claim 11 further comprising at least one liner provided between the base and the cushion.

* * * * *